US012753286B2

(12) United States Patent
Kuroki et al.

(10) Patent No.: US 12,753,286 B2
(45) Date of Patent: Oct. 6, 2026

(54) FLUORINE RESIN FILM AND MOLDED RUBBER BODY

(71) Applicants: NITTO DENKO CORPORATION, Osaka (JP); DAIKYO SEIKO, LTD., Tochigi (JP)

(72) Inventors: Yuta Kuroki, Osaka (JP); Narumi Ueda, Osaka (JP); Kurato Akiba, Osaka (JP); Keiko Fujiwara, Osaka (JP)

(73) Assignees: NITTO DENKO CORPORATION, Osaka (JP); DAIKYO SEIKO, LTD., Tochigi (JP)

( * ) Notice: Subject to any disclaimer, the term of this patent is extended or adjusted under 35 U.S.C. 154(b) by 720 days.

(21) Appl. No.: 18/030,147

(22) PCT Filed: Aug. 5, 2021

(86) PCT No.: PCT/JP2021/029232

§ 371 (c)(1),
(2) Date: Apr. 4, 2023

(87) PCT Pub. No.: WO2022/074927

PCT Pub. Date: Apr. 14, 2022

(65) Prior Publication Data

US 2023/0279191 A1 Sep. 7, 2023

(30) Foreign Application Priority Data

Oct. 8, 2020 (JP) ................................ 2020-170706

(51) Int. Cl.
*C08J 7/04* (2020.01)
*C08L 27/18* (2006.01)

(52) U.S. Cl.
CPC ............. *C08J 7/0427* (2020.01); *C08L 27/18* (2013.01); *C08J 2327/18* (2013.01); *C08L 2203/16* (2013.01)

(58) Field of Classification Search
CPC ....... C08J 5/18; C08J 7/12; C08J 7/123; C08J 7/0427; C08J 2203/16
See application file for complete search history.

(56) References Cited

U.S. PATENT DOCUMENTS

| | | | | |
|---|---|---|---|---|
| 5,324,566 | A | 6/1994 | Ogawa et al. | |
| 5,437,894 | A | 8/1995 | Ogawa et al. | |
| 5,718,957 | A * | 2/1998 | Yokoe | B29C 48/09 428/34.7 |
| 2021/0340409 | A1 | 11/2021 | Takamura et al. | |

FOREIGN PATENT DOCUMENTS

| | | | |
|---|---|---|---|
| CN | 1115568 | A | 1/1996 |
| EP | 0 205 312 | A1 | 12/1986 |
| JP | 54-095982 | A | 7/1979 |
| JP | 56-104019 | A | 8/1981 |
| JP | 59-191735 | A | 10/1984 |
| JP | 59-191736 | A | 10/1984 |
| JP | 61-277445 | A | 12/1986 |
| JP | 62-101636 | A | 5/1987 |
| JP | 4-359031 | A | 12/1992 |
| JP | 7-178875 | A | 7/1995 |
| JP | 7-331010 | A | 12/1995 |
| JP | 8-230095 | A | 9/1996 |
| JP | 2002-59486 | A | 2/2002 |
| JP | 2004-323593 | A | 11/2004 |
| JP | 2006-1014 | A | 1/2006 |
| JP | 2006-192906 | A | 7/2006 |
| JP | 2012-233189 | A | 11/2012 |
| JP | 2014-080507 | A | 5/2014 |
| JP | 55-98854 | U | 10/2014 |
| JP | 2020-12039 | A | 1/2020 |

OTHER PUBLICATIONS

Office Action and Search Report that issued in corresponding Chinese Patent Application No. 202180068659.9, dated Sep. 24, 2025, along with English translations thereof.

Office Action that issued in corresponding Japanese Patent Application No. 2020-170706, dated Sep. 30, 2025, along with English translations thereof.

Office Action that issued in corresponding Taiwanese Patent Application No. 110136893, dated Oct. 1, 2025, along with English translations thereof.

Submission of Publications which was submitted in corresponding Japanese Application No. 2020-170706, dated Jan. 21, 2025, along with English translation thereof.

Office Action that issued in corresponding Japanese Patent Application No. 2020-170706, dated Apr. 15, 2025, along with its English translation.

Office Action that issued in corresponding Taiwanese Patent Application No. 110136893, dated Dec. 27, 2024, along with its English translation.

Office Action that issued in the corresponding Japanese Patent Application No. 2020-170706, dated Jun. 4, 2024, along with its English translation.

(Continued)

*Primary Examiner* — Christopher M Rodd

(74) *Attorney, Agent, or Firm* — Greenblum & Bernstein, P.L.C.

(57) ABSTRACT

A fluorine resin film to be provided includes a fluorine resin, and has a surface subjected to a modification treatment. The fluorine resin film has, at the surface, the following proportion of each of carbon, oxygen, and fluorine elements based on 100 atom % of a sum of the elements: 30 atom % or more and 70 atom % or less of carbon; 0.6 atom % or more and less than 13 atom % of oxygen; and 60 atom % or less of fluorine. This fluorine resin film is a fluorine resin film having a surface subjected to a modification treatment, and is suitable for manufacturing a molded rubber body having a surface coated with the film.

11 Claims, 4 Drawing Sheets

(56) References Cited

OTHER PUBLICATIONS

Office Action and Search Report that issued in corresponding Chinese Patent Application No. 202180068659.9, dated May 15, 2025, , along with English translations thereof.

International Search Report and Written Opinion of the International Searching Authority issued in International Patent Application No. PCT/JP2021/029232, mailed Oct. 12, 2021, along with an English translation thereof.

Office Action that issued in corresponding Chinese Patent Application No. 202180068659.9, dated Mar. 12, 2026, along with English translations thereof.

* cited by examiner

FLUORINE RESIN FILM AND MOLDED RUBBER BODY

TECHNICAL FIELD

The present invention relates to a fluorine resin film and a molded rubber body.

BACKGROUND ART

Fluorine resin films are chemically stable, and accordingly are used as films for coating the surface of a rubber-containing substrate. Molded rubber bodies including a rubber-containing substrate and a fluorine resin film coating the surface of the rubber-containing substrate are used as diaphragms, rollers, gaskets, hoses, tubes, and the like. Patent Literature 1 discloses a diaphragm having a surface coated with a fluorine resin film. The diaphragm of Patent Literature 1 is highly durable to ozone in the atmosphere, the fuel, and so on.

On the other hand, fluorine resin films are generally low in adhesiveness to other substances and members. It is known that the adhesiveness of fluorine resin films is enhanced by a modification treatment such as a sputter etching treatment (see Patent Literature 2).

CITATION LIST

Patent Literature

Patent Literature 1: Microfilm of Japanese Utility Model Application No. S53(1978)-182502 (JP S55(1980)-98854 U)

Patent Literature 2: JP 2012-233189 A

SUMMARY OF INVENTION

Technical Problem

An insufficient adhesiveness to the rubber-containing substrate tends to cause, in the molded rubber body, the occurrence of a defect such as a floating of the fluorine resin film from the rubber-containing substrate. The adhesiveness between the fluorine resin film and the rubber-containing substrate is enhanced by a modification treatment. However, studies by the present inventors have found that even the use of a fluorine resin film subjected to a modification treatment can cause the occurrence of the above defect in the resultant molded rubber body and that the above defect tends to occur especially during in-mold molding according to which a rubber is shaped in a state where the fluorine resin film is placed in a mold.

The present invention aims to provide a fluorine resin film having a surface subjected to a modification treatment and being suitable for manufacturing a molded rubber body having a surface coated with the film.

Solution to Problem

The present invention provides a fluorine resin film including a fluorine resin, wherein the fluorine resin film has a surface subjected to a modification treatment, and has, at the surface, the following proportion of each of carbon, oxygen, and fluorine elements based on 100 atom % of a sum of the elements:

30 atom % or more and 70 atom % or less of carbon;

0.6 atom % or more and less than 13 atom % of oxygen; and 60 atom % or less of fluorine.

Another aspect of the present invention provides a molded rubber body including:

a rubber-containing substrate; and a resin film, wherein the rubber-containing substrate has a surface coated with the resin film, and the resin film is the fluorine resin film of the present invention.

Advantageous Effects of Invention

The fluorine resin film of the present invention, which has the above controlled proportions at the surface subjected to the modification treatment, is suitable for manufacturing a molded rubber body having a surface coated with the film.

DESCRIPTION OF EMBODIMENT

An embodiment of the present invention will be described below with reference to the drawings. The present invention is not limited to the following embodiment.

[Fluorine Resin Film]

Figure 1:
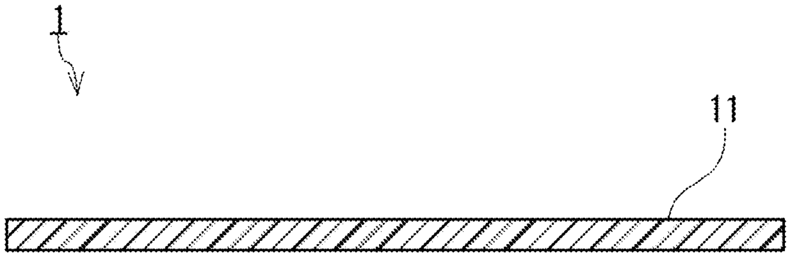
FIG. 1 is a cross-sectional view schematically showing an example of a fluorine resin film of the present invention.

FIG. 1 shows a fluorine resin film of the present embodiment. The fluorine resin film 1 in FIG. 1 contains a fluorine resin, and has a surface 11 subjected to a modification treatment. The fluorine resin film 1 has, at the surface 11, the following proportion of each of carbon, oxygen, and fluorine elements based on 100 atom % of the sum of the elements: 30 atom % or more and 70 atom % or less of carbon; 0.6 atom % or more and less than 13 atom % of oxygen; and 60 atom % or less of fluorine. Hereinafter, the proportion of each of carbon, oxygen, and fluorine elements at the surface 11 refers to the value based on 100 atom % of the sum of the elements, unless otherwise noted. According to the fluorine resin film 1, even when the film is stretched, the deterioration in adhesiveness at the surface 11 is reduced. This is presumably because, in the surface 11 at which the above proportions are controlled, an enhancement in adhesiveness by the modification treatment is achieved and also the occurrence of a crack resulting from stretching is reduced. The deterioration in adhesiveness caused by the occurrence of a crack is possibly due to an exposure of the modification-untreated inner portion of the film to the surface.

The lower limit for the proportion of carbon may be 33 atom % or more, 35 atom % or more, 38 atom % or more, or even 40 atom % or more. The upper limit for the proportion of carbon may be 65 atom % or less, 60 atom % or less, 55 atom % or less, 50 atom % or less, 45 atom % or less, 44 atom % or less, or even 43 atom % or less.

The upper limit for the proportion of oxygen may be 12 atom % or less, 11 atom % or less, 10 atom % or less, 9 atom % or less, 8 atom % or less, 7 atom % or less, 6 atom % or less, or even 5 atom % or less. The lower limit for the proportion of oxygen may be 0.7 atom % or more, 0.8 atom % or more, 0.9 atom % or more, or even 1 atom % or more.

The upper limit for the proportion of fluorine may be 59 atom % or less or even 58 atom % or less. The lower limit for the proportion of fluorine is, for example, more than 17 atom %, and may be 20 atom % or more, 25 atom % or more, 30 atom % or more, 35 atom % or more, 40 atom % or more, 45 atom % or more, 48 atom % or more, 50 atom % or more, or even 52 atom % or more.

The oxygen/carbon element ratio (hereinafter referred to as the O/C ratio) at the surface 11 may be 0.25 or less, 0.20 or less, 0.17 or less, 0.15 or less, 0.12 or less, 0.10 or less, 0.09 or less, or even 0.08 or less. The lower limit for the O/C ratio is, for example, 0.01 or more, and may be 0.02 or more. An appropriate control of the O/C ratio can contribute to a more reliable reduction of the deterioration in adhesiveness of the surface 11 resulting from stretching. The O/C ratio can be calculated from the proportion of oxygen and the proportion of carbon at the surface 11.

The fluorine/carbon element ratio (hereinafter referred to as the F/C ratio) at the surface 11 may be 0.32 or more and 1.82 or less. The lower limit for the F/C ratio may be 0.50 or more, 0.70 or more, 0.90 or more, 1.00 or more, 1.05 or more, 1.10 or more, 1.15 or more, 1.20 or more, or even 1.25 or more. The upper limit for the F/C ratio may be 1.75 or less, 1.70 or less, 1.65 or less, 1.60 or less, 1.55 or less, or even 1.50 or less. An appropriate control of the F/C ratio can contribute to a more reliable reduction of the deterioration in adhesiveness of the surface 11 resulting from stretching. The F/C ratio can be calculated from the proportion of fluorine and the proportion of carbon at the surface 11.

In the surface 11, atoms of an additional element may be present. Examples of the additional element include nitrogen, silicon, and a metal derived from the chamber, the target, and the like used in the modification treatment. The sum of the proportions of the additional elements at the surface 11 based on 100 atom % of the total of carbon, oxygen, fluorine, and the additional elements is, for example, 5 atom % or less, and may be 3 atom % or less, 2 atom % or less, or even 1 atom % or less.

The proportion of each of the elements at the surface 11 can be evaluated by electron spectroscopy for chemical analysis (ESCA).

The fluorine resin film of the present embodiment is suitable also for reducing the coloring associated with the modification treatment. The absolute value of the value of b* (hereinafter this absolute value is referred to as |b*|) of the CIE1976 (L*, a*, b*) color space (hereinafter referred to as the (L*, a*, b*) color space) specified in Japanese Industrial Standards (hereinafter referred to as JIS) Z 8781-4: 2013 at the surface 11 is, for example, less than 3.1, and may be 3.0 or less, 2.9 or less, or even 2.8 or less. The lower limit for |b*| is, for example, 0, and may be 0.5 or more, 1.0 or more, 1.5 or more, or even 2.0 or more. The smaller |b*| is, the more the coloring is reduced.

With respect to b* of the (L*, a*, b*) color space, the absolute value of a difference Δb* ($=b^*_1-b^*_0$) (hereinafter this absolute value is referred to as |Δb*|) between the value of $b^*_1$ at the surface 11 and the value of $b^*_0$ in the white reflection standard (e.g., white calibration plate CR-A43 manufactured by KONICA MINOLTA, INC.) specified in JIS Z 8781-4: 2013 is, for example, 0.45 or less, and may be 0.40 or less, 0.35 or less, 0.30 or less, 0.25 or less, or even 0.20 or less. The lower limit for |Δb*| is, for example, 0, and may be 0.10 or more. The smaller |Δb*| is, the more the coloring is reduced.

The absolute value of the value of a* (hereinafter this absolute value is referred to as |a*|) of the (L*, a*, b*) color space at the surface 11 is, for example, 0.05 or less, and may be 0.03 or less, 0.02 or less, or even 0.01 or less. The lower limit for |a*| is, for example, 0. The smaller |a*| is, the more the coloring is reduced.

At least two selected from the group consisting of |b*|, |Δb*|, and |a*| at the surface 11 may fall within the ranges described above, or all the three may fall within the ranges described above.

The chromaticity a* and b* and the chromaticity difference Δb* at the surface 11 can be evaluated, for example, with a measurement device such as a spectropolarimeter or a colorimeter (e.g., chroma meter CR series manufactured by KONICA MINOLTA, INC.) compliant with the above standards. The evaluation is performed by normalizing the stimulus values X, Y, and Z in colorimetry of the white calibration plate so as to fall within ±0.03 of the reference value. The light source to be used is auxiliary illuminant C (C light source) for colorimetry specified in JIS Z 8720: 2012. The visual angle is set to 2 degrees.

The surface 11 may have an adhesiveness, expressed as the peel strength evaluated by a 180° peel test, of 4.0 N/19 mm or more, 4.5 N/19 mm or more, 5.0 N/19 mm or more, 5.5 N/19 mm or more, 6.0 N/19 mm or more, 6.5 N/19 mm or more, or even 7.0 N/19 mm or more. The 180° peel test is performed by attaching the fluorine resin film 1 and an adhesive tape (No. 31 B manufactured by NITTO DENKO CORPORATION, 80 μm thick) to each other so that the adhesive surface of the adhesive tape and the surface 11 are in contact with each other, and then peeling off the adhesive tape from the fluorine resin film 1. The upper limit for the adhesiveness of the surface 11 is, for example, 15.0 N/19 mm or less expressed as the above peel strength. Note that No. 31B has a sufficient adhesive force for evaluating the above peel strength.

The fluorine resin film 1 in FIG. 1 has the surface 11 on one of the principal surfaces. The fluorine resin film 1 may have the surface 11 on each of both the principal surfaces. In the case where the fluorine resin film 1 has the two or more principal surfaces 11, the surfaces 11 may be the same or different from each other in terms of the composition (the element proportion and the element ratio) and the characteristics such as the chromaticity, the chromaticity difference, and the adhesiveness.

The fluorine resin film 1 in FIG. 1 has the surface 11 on the entire one principal surface. The fluorine resin film 1 may have the surface 11 on only a part of the principal surface. Alternatively, the fluorine resin film 1 may have the two or more surfaces 11 on one principal surface.

The fluorine resin film 1 has a thickness of, for example, 10 to 300 μm, and may have a thickness of 30 to 250 μm or even 50 to 200 μm.

The fluorine resin film 1 in FIG. 1 is single-layered. The fluorine resin film 1 may be any laminate of two or more layers as long as the fluorine resin film 1 has the surface 11.

An example of the fluorine resin is at least one selected from the group consisting of an ethylene-tetrafluoroethylene copolymer (ETFE), a tetrafluoroethylene-hexafluoropropylene copolymer (FEP), a tetrafluoroethylene-perfluoroalkoxyethylene copolymer (PFA), polychlorotrifluoroethylene (PCTFE), and polytetrafluoroethylene (PTFE). The fluorine resin may be at least one selected from the group consisting of PTFE and ETFE, or may be ETFE.

The fluorine resin film 1 may contain a fluorine resin as its main component. The main component as used herein refers to a component having the largest content. The content of the fluorine resin in the fluorine resin film 1 is, for example, 50 weight % or more, and may be 60 weight % or more, 70 weight % or more, 80 weight % or more, 90 weight % or more, 95 weight % or more, or even 99 weight % or more. The fluorine resin film 1 may be formed of the fluorine resin. The fluorine resin film 1 can contain two or more fluorine resins.

The fluorine resin film 1 may contain an additional material in addition to the fluorine resin. An example of the additional material in the fluorine resin film 1 is a resin other than the fluorine resin. Examples of the resin include a polyolefin such as polyethylene and polypropylene and a polyvinylidene chloride. The content of the additional material in the fluorine resin film 1 is, for example, 20 weight % or less, and may be 10 weight % or less, 5 weight % or less, 3 weight % or less, or even 1 weight % or less.

The fluorine resin film 1 is in the shape of, for example, a polygon such as a square or a rectangle, a circle, an oval, or a strip. The polygon may have a rounded corner. However, the shape of the fluorine resin film 1 is not limited to the above examples. The polygonal-shaped, circular-shaped, or oval-shaped fluorine resin film 1 can be distributed in the form of a sheet, and the strip-shaped fluorine resin film 1 can be distributed in the form of a wound body (roll) wound around a core. It is possible to set, to any values, the width of the strip-shaped fluorine resin film 1 and the width of the wound body formed of the strip-shaped wound fluorine resin film 1.

The fluorine resin film 1 is usually non-porous. The fluorine resin film 1 may be an imperforate film having no hole communicating between both the principal surfaces at least in the region of use.

The fluorine resin film 1 may be an impermeable film that does not allow a fluid such as water, an aqueous solution, oil, and an organic liquid to permeate therethrough in the thickness direction because of high liquid repellency (water repellency and oil repellency) of the fluorine resin. Further, the fluorine resin film 1 may be an insulating film (non-conductive film) because of high insulating properties of the fluorine resin. The insulating properties are expressed, for example, as a surface resistivity of $1\times10^{14}\Omega/\square$ or more.

The fluorine resin film 1 can be used, for example, as a coating film for coating the surface of a rubber-containing substrate included in a molded rubber body. The coating film is usually used so as to conform to the shape of the surface of the rubber-containing substrate. In this case, the coating film is forced to be stretched depending on the above shape. Further, according to in-mold molding, the degree to which the fluorine resin film is stretched during the rubber shaping is high. However, according to the fluorine resin film 1, even when the film is stretched, it is possible to reduce the deterioration in adhesiveness to the rubber-containing substrate.

Examples of the molded rubber body include a diaphragm, a roller, a gasket, a hose, and a tube. However, the molded rubber body is not limited to the above examples.

The application of the fluorine resin film 1 is not limited to the above examples.

The fluorine resin film 1 can be manufactured, for example, by a method of subjecting an original film containing a fluorine resin to a modification treatment and thus to form the surface 11 on a principal surface. An example of the above method will be described below. However, the method for manufacturing the fluorine resin film 1 is not limited to the above method and the following examples.

The original film is typically a film having the same configuration as that of the fluorine resin film 1 except that the original film does not have the surface 11.

Examples of the modification treatment on the original film include a sputter etching treatment, an ion beam treatment, a laser etching treatment, a sandblasting treatment, and a treatment with sandpaper. However, the modification treatment is not limited to the above examples as long as the surface 11, at which a predetermined proportion of each of carbon, oxygen, and fluorine is achieved, is formed owing to the increase in surface energy at the modification-treated surface of the original film. The modification treatment may be the sputter etching treatment or the ion beam treatment in view of their capability of efficiently forming the surface 11, or may be the sputter etching treatment.

The sputter etching treatment can be performed typically by applying a high-frequency voltage to the original film in a state where a chamber housing the original film is depressurized and an ambient gas is introduced into the chamber. The application of the high-frequency voltage can be performed, for example, by using a cathode in contact with the original film and an anode away from the original film. In this case, the surface 11 is formed on the principal surface on the anode side, which is an exposed surface of the original film. A known apparatus can be used for the sputter etching treatment.

Examples of the ambient gas include a noble gas such as helium, neon, and argon, an inert gas such as nitrogen, and a reactive gas such as oxygen and hydrogen. The ambient gas may be at least one selected from the group consisting of argon and oxygen in view of their capability of efficiently forming the surface 11, or may be oxygen. Only one ambient gas may be used.

The frequency of the high-frequency voltage is, for example, 1 to 100 MHz, and may be 5 to 50 MHz. The pressure in the chamber during the treatment is, for example, 0.05 to 200 Pa, and may be 0.5 to 100 Pa.

The amount of energy for the sputter etching treatment (the product of the electric power per unit area to be applied to the original film and the treatment time) is, for example, 0.1 to 100 J/cm$^2$, and may be 0.1 to 50 J/cm$^2$, 0.1 to 40 J/cm$^2$, or even 0.1 to 30 J/cm$^2$. An excessive increase in amount of energy tends to excessively increase the proportion of oxygen and/or the O/C ratio at the surface 11 or excessively decrease the F/C ratio at the surface 11.

The sputter etching treatment may be performed as batch processing or continuous processing. An example of the continuous processing will be described with reference to FIG. 2.

Figure 2:
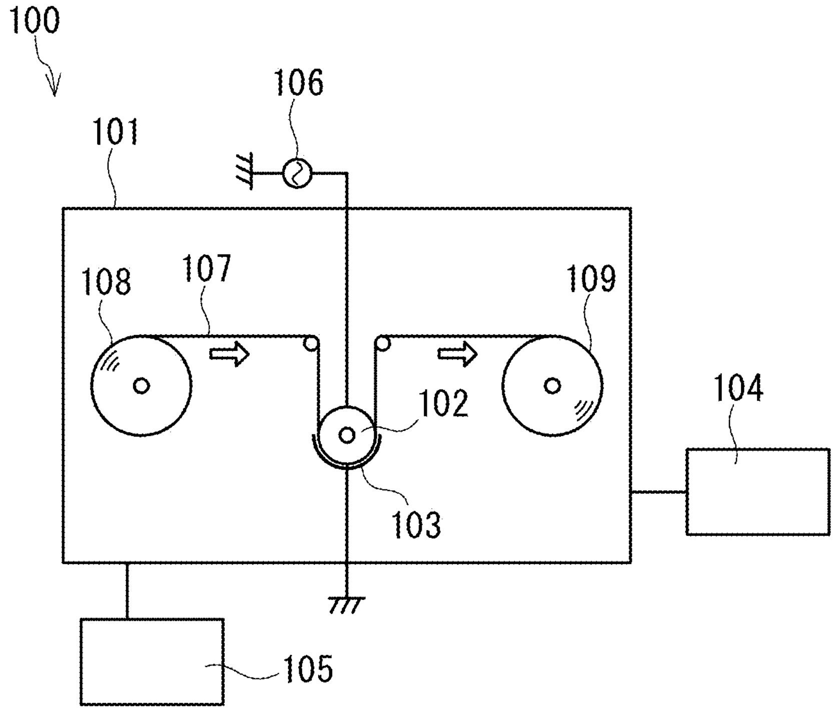
FIG. 2 is a schematic view showing an example of an apparatus capable of manufacturing the fluorine resin film of the present invention.

FIG. 2 shows an example of a continuous processing apparatus. A processing apparatus 100 in FIG. 2 includes a chamber 101, and a roll electrode 102 and a curved plate-shaped electrode 103 that are disposed in the chamber 101. To the chamber 101, a decompression device 104 for decompressing the chamber 101 and a gas supply device 105 for supplying an ambient gas to the chamber 101 are connected. The roll electrode 102 is connected to a high-frequency power source 106, and the curved plate-shaped electrode 103 is grounded. An original film 107 is in the shape of a strip and wound around a feed roll 108. The original film 107 is continuously fed from the feed roll 108, and is passed between the roll electrode 102 and the curved plate-shaped electrode 103 along the roll electrode 102 while a high-frequency voltage is applied. Thus, continuous processing can be performed. In the example in FIG. 2, the surface 11 is formed on the principal surface on the curved plate-shaped electrode 103 side of the original film 107. The original film 107 after the processing is wound around a winding roll 109.

[Molded Rubber Body]

Figure 3A:
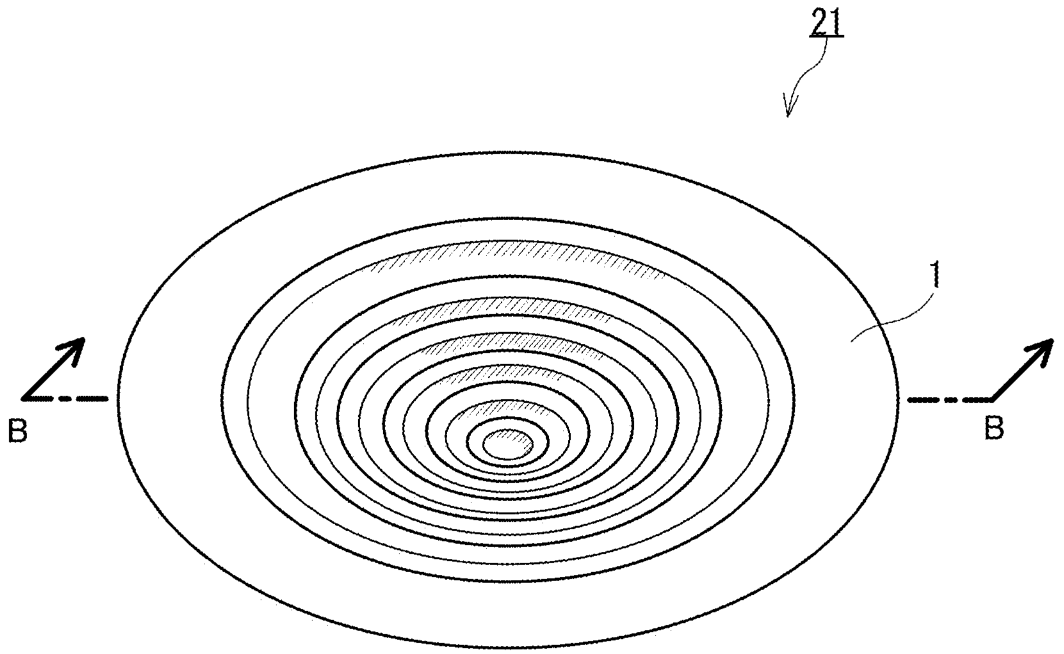
FIG. 3A is a plan view schematically showing an example of a molded rubber body of the present invention.
Figure 3B:
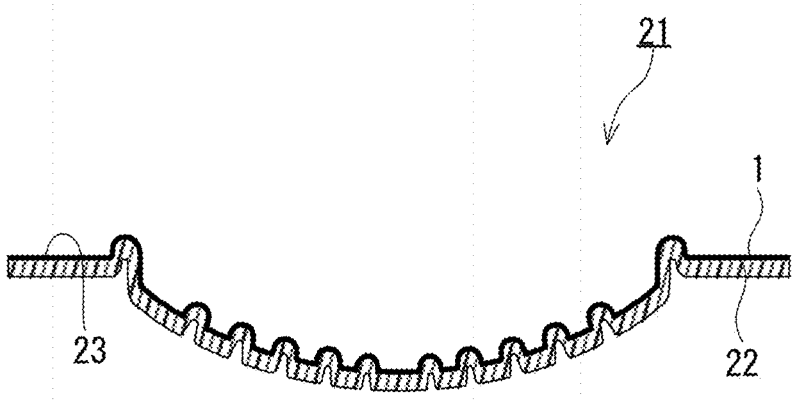
FIG. 3B is a cross-sectional view showing a cross section B-B of the molded rubber body in FIG. 3A.

FIG. 3A and FIG. 3B show an example of the molded rubber body of the present embodiment. In FIG. 3B, a cross section B-B of a molded rubber body 21 in FIG. 3A is shown. The molded rubber body 21 in FIG. 3A and FIG. 3B is a corrugated diaphragm. The molded rubber body 21 includes a rubber-containing substrate 22 and the fluorine resin film 1. The rubber-containing substrate 22 has a surface 23 coated with the fluorine resin film 1. The surface 23 is corrugated, and accordingly the fluorine resin film 1 is strongly stretched partially (e.g., at the crest of the corrugation) during the manufacture of the molded rubber body 21.

The entire surface of the molded rubber body 21 may be the surface 23, or a part of the surface of the molded rubber body 21 may be the surface 23.

The rubber-containing substrate 22 usually contains a rubber as its main component. Examples of the rubber include a butyl rubber, a natural rubber, an ethylene propylene rubber (EPDM), a silicone rubber, and a fluorine rubber. The rubber-containing substrate 22 can contain a material in addition to the rubber, for example, an inorganic filler, an organic filler, a reinforcing fiber, an antioxidant, and/or a plasticizer.

The molded rubber body of the present invention is not limited to the above examples and may be any molded rubber body having the surface 23. The molded rubber body other than a diaphragm is, for example, a roller, a gasket, a hose, or a tube.

The molded rubber body of the present invention can be manufactured, for example, by performing in-mold molding in a state where the fluorine resin film 1 is placed in a mold. This aspect of the present invention provides a method for manufacturing a molded rubber body having a surface coated with a resin film, the method including performing in-mold molding in a state where the resin film is placed in a mold, thereby obtaining the molded rubber body, wherein the resin film is the fluorine resin film 1.

EXAMPLES

The present invention will be more specifically described below with reference to examples. The present invention is not limited to the following examples.

First, the method for evaluating fluorine resin films will be described.

[Composition Analysis on Surface]

The composition analysis on the surface was performed by ESCA. In fluorine resin films produced in the examples and comparative examples, the modification-treated surface was set to the evaluation surface. In a fluorine resin film prepared in a reference example, one of the principal surfaces was set to the evaluation surface. A wide-scan measurement was performed on the evaluation surface with an ESCA spectrometer (Quantum 2000 manufactured by ULVAC-PHI, Inc.). Then, a narrow-scan measurement was performed with respect to the peaks of carbon, oxygen, and fluorine to obtain the integrated intensity (area) of each of the peaks of the elements. From the integrated intensity obtained, the proportion of each of the elements, the O/C ratio, and the F/C ratio at the evaluation surface were calculated. The conditions for the wide-scan measurement and the narrow-scan measurement were as follows.

Induced X-ray: AlKα-ray, use of monochromator

Induced X-ray output: 30 W (accelerating voltage of 15 kV)

Photoelectron take-off angle: 45° relative to evaluation surface

Binding energy correction: Correction of peak derived from F1s to 689.1 eV

Charge neutralization: Combined use of electron gun and Ar ion gun (neutralization mode)

[Peel Strength]

The peel strength was evaluated as follows. First, the fluorine resin film was cut in a rectangular shape having a width of 19 mm and a length of 150 mm to obtain a test specimen. Next, the test specimen was attached to the surface of a stainless steel plate with a double-sided adhesive tape (No. 500 manufactured by NITTO DENKO CORPORATION). The attachment was performed so that the entire test specimen was in contact with the stainless steel plate and so that the modification-treated surface of the film of each of the examples and the comparative examples was exposed. The double-sided adhesive tape selected was one with an enough adhesive force to prevent a peel-off of the test specimen from the stainless steel plate during the evaluation. Next, to the exposed surface of the test specimen, a single-sided adhesive tape (No. 31B manufactured by NITTO DENKO CORPORATION, 80 μm thick, acrylic adhesive) having a width of 19 mm and a length of 200 mm was attached. The attachment was performed so as to satisfy the following requirements that: the long side of the test specimen and the long side of the single-sided adhesive tape coincide with each other; one end portion in the longitudinal direction of the single-sided adhesive tape is a free end over the length of 120 mm without being in contact with the test specimen; and the entire adhesive layer of the single-sided adhesive tape excluding the above free end is in contact with the test specimen. Moreover, in the attachment, to further reliably join the single-sided adhesive tape and the test specimen to each other, a pressure-bonding roller having a mass of 2 kg specified in JIS Z 0237: 2009 was reciprocated once at a temperature of 25° C. Next, to stabilize the joining between the single-sided adhesive tape and the test specimen, the test sample was allowed to stand for 30 minutes after the reciprocation of the pressure-bonding roller. Then, the test specimen was set in a tensile testing machine. The setting was performed so as to satisfy the following requirements that: the longitudinal direction of the test specimen coincides with the direction between the chucks of the testing machine; one chuck of the testing machine holds the above free end of the single-sided adhesive tape while the other chuck holds the test specimen and the stainless steel plate. Next, a 180° peel test was performed in which the single-sided adhesive tape was peeled off from the test specimen at the peel angle of 180° and the test speed of 300 mm/min. The measured value for the length of the initial 20 mm peeled off after the start of the test was ignored. Then, the average value of the measured values for the length of 60 mm peeled off was determined as the peel strength of the test specimen. The test was performed in an environment at a temperature of 25±1° C. and a relative humidity of 50±5%.

[Whether Crack Resulting from Stretching Occurred]

The fluorine resin film was subjected to a stretching test in which stretching that occurs during the rubber shaping process is simulated. The surface of the film after the test was observed with an SEM (JSM 7500F manufactured by JEOL Ltd.) at a magnification of 20000 times to check whether a crack (stretching-induced crack) had occurred. In the fluorine resin films produced in the examples and comparative examples, the modification-treated surface was set to the observation surface. In the fluorine resin film prepared in the reference example, the one principal surface was set to the observation surface. The stretching test was performed by the following procedure. The fluorine resin film was cut in the size of 100 mm×100 mm to obtain a test specimen. Next, the test specimen was set in a biaxial stretching machine (manufactured by ITOCHU SANKI CORPORATION), heated at 180° C. for 45 seconds, and then simultaneously biaxially stretched at a stretching speed of 1 m/min and an area stretching ratio of 6.25 times (=2.5 times×2.5 times).

[Chromaticity a* and b* and Chromaticity Difference Δb*]

The chromaticity a* and b* and the chromaticity difference Δb* at the evaluation surface were respectively evaluated as the chromaticity a* and b* and the chromaticity difference Δb* of the CIE1976 (L*, a*, b*) color space with a chroma meter (CR400 manufactured by KONICA MINOLTA, INC.) capable of evaluation based on JIS Z 8781-4: 2003. In the fluorine resin films produced in the examples and comparative examples, the modification-treated surface was set to the evaluation surface. In the fluorine resin film prepared in the reference example, the one principal surface was set to the evaluation surface. The evaluation conditions for the chromaticity and the chromaticity difference were as follows. The evaluation was performed in a state where the fluorine resin film was placed on a white calibration plate (CR-A43 manufactured by KONICA MINOLTA, INC.).

Light source: Auxiliary illuminant C (C light source) for colorimetry specified in JIS Z 8720: 2012

Visual angle: 2 degrees

Normalization was performed so that the stimulus values X, Y, and Z in colorimetry of the white calibration plate fall within ±0.03 of the reference value.

Example 1

The original film prepared was an ETFE film (manufactured by NITTO DENKO CORPORATION, 10 μm thick), which is a workpiece yet to be subjected to a modification treatment. Next, one principal surface of the original film was subjected to a modification treatment by a sputter etching treatment. Thus, a fluorine resin film of Example 1 was obtained. For the modification treatment, the processing pressure was set to 3.0 Pa, argon gas (Ar) was used as the ambient gas, and the amount of energy was set to 0.7 J/cm$^2$.

Example 2

A fluorine resin film of Example 2 was obtained in the same manner as in Example 1, except that oxygen gas ($O_2$) was used as the ambient gas and the amount of energy was set to 5 J/cm$^2$ for the modification treatment.

Example 3

A fluorine resin film of Example 3 was obtained in the same manner as in Example 1, except that oxygen gas was used as the ambient gas for the modification treatment.

Example 4

A fluorine resin film of Example 4 was obtained in the same manner as in Example 1, except that oxygen gas was used as the ambient gas and the amount of energy was set to 0.2 J/cm$^2$ for the modification treatment.

Comparative Example 1

A fluorine resin film of Comparative Example 1 was obtained in the same manner as in Example 1, except that oxygen gas was used as the ambient gas and the amount of energy was set to 20 J/cm$^2$ for the modification treatment.

Comparative Example 2

A fluorine resin film of Comparative Example 2 was obtained in the same manner as in Example 1, except that the amount of energy was set to 5 J/cm$^2$ for the modification treatment.

Reference Example

The original film prepared in Example 1 was used as the reference example.

Figure 4:
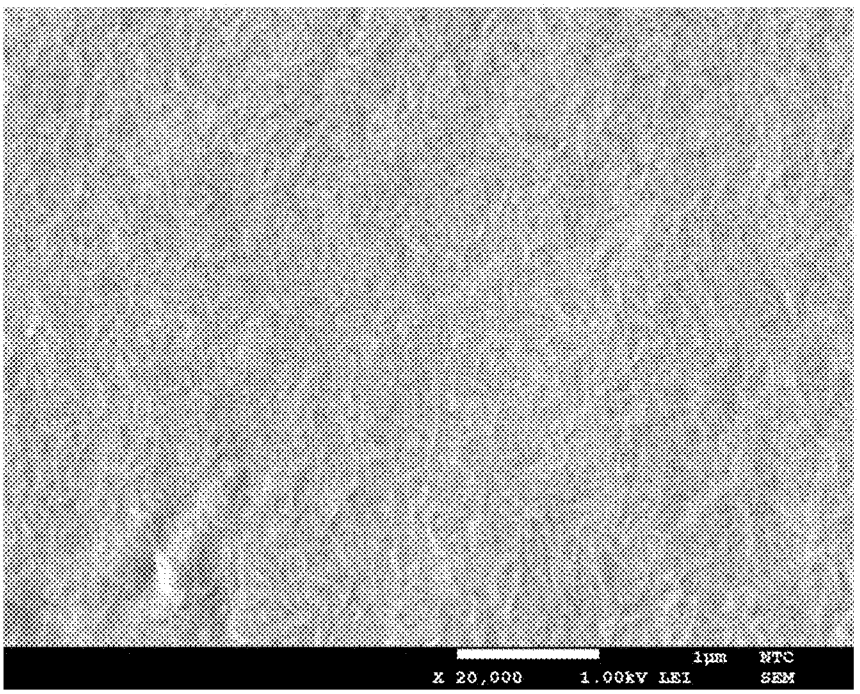
FIG. 4 is an observation image, obtained with a scanning electron microscope (hereinafter referred to as an SEM), of the surface of a fluorine resin film of Example 2 after a stretching test.
Figure 5:
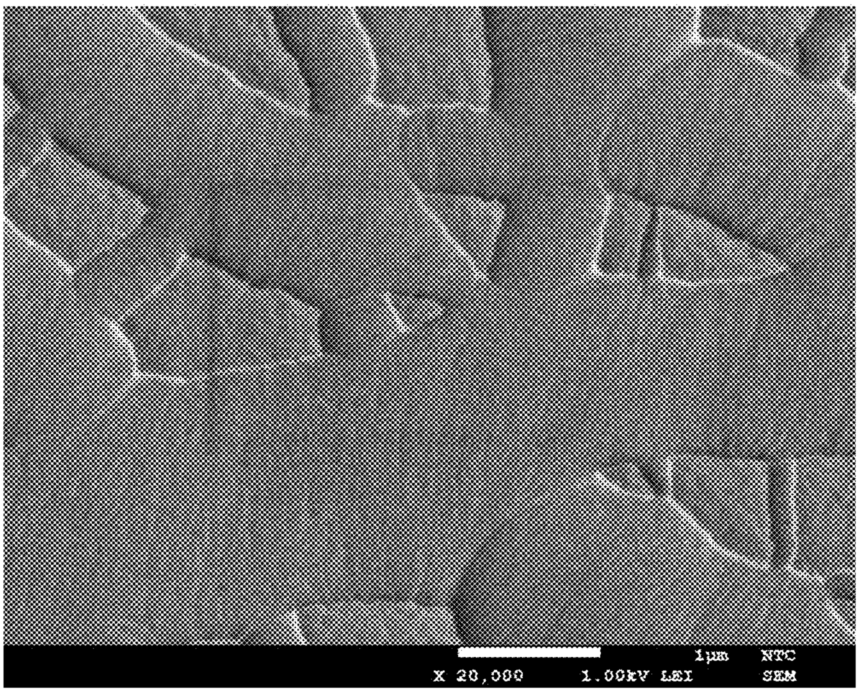
FIG. 5 is an observation image, obtained with the SEM, of the surface of a fluorine resin film of Comparative Example 1 after the stretching test.
Figure 6:
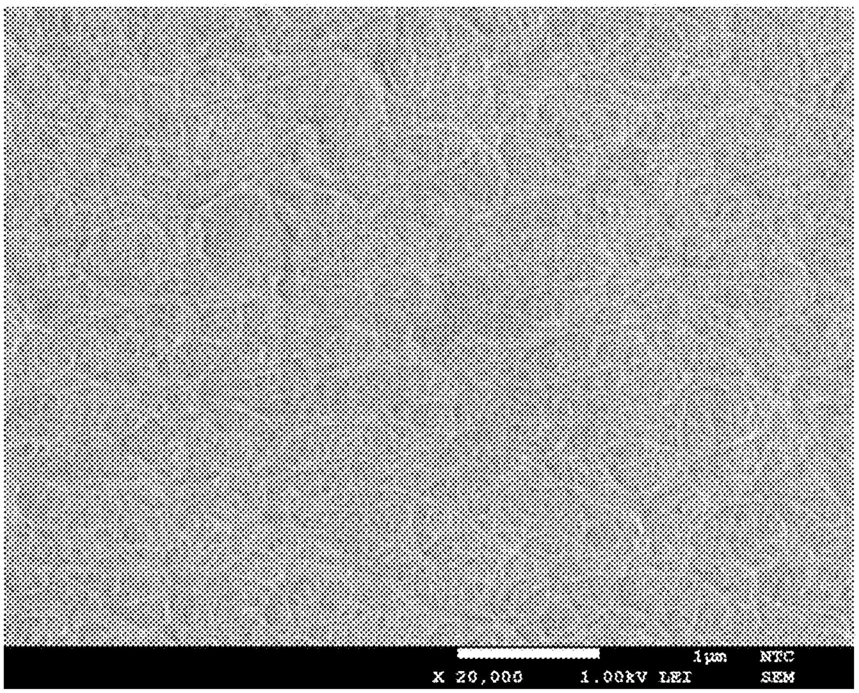
FIG. 6 is an observation image, obtained with the SEM, of the surface of a fluorine resin film of a reference example after the stretching test.

The evaluation results of each of the fluorine resin films are shown in Table 1 below. In addition, FIG. 4, FIG. 5, and FIG. 6 respectively show observation images, obtained with an SEM, of the surfaces (observation surfaces) of the fluorine resin films of Example 2, Comparative Example 1, and the reference example after the stretching test.

TABLE 1

| | | Example 1 | Example 2 | Example 3 | Example 4 | Comparative Example 1 | Comparative Example 2 | Reference Example |
|---|---|---|---|---|---|---|---|---|
| Modification treatment | Ambient gas | Ar | $O_2$ | $O_2$ | $O_2$ | $O_2$ | Ar | — |
| | Amount of energy (J/cm$^2$) | 0.7 | 5 | 0.7 | 0.2 | 20 | 5 | — |

TABLE 1-continued

| | | Example 1 | Example 2 | Example 3 | Example 4 | Comparative Example 1 | Comparative Example 2 | Reference Example |
|---|---|---|---|---|---|---|---|---|
| Composition analysis | Carbon | 45 | 45 | 43 | 42 | 55 | 46 | 43 |
| | Oxygen | 7 | 9 | 3 | 1 | 16 | 17 | 0 |
| | Fluorine | 48 | 46 | 54 | 56 | 28 | 37 | 57 |
| | F/C ratio | 1.07 | 1.02 | 1.26 | 1.33 | 0.51 | 0.80 | 1.33 |
| | O/C ratio | 0.16 | 0.20 | 0.07 | 0.02 | 0.29 | 0.37 | 0.00 |
| Adhesiveness (N/19 mm) | | 7.37 | 7.39 | 7.38 | 6.05 | 7.33 | 9.94 | 3.46 |
| Occurrence of stretching-induced crack | | No | No | No | No | Yes | Yes | No |
| Coloring | $\|a^*\|$ | 0.00 | 0.01 | 0.01 | 0.01 | 0.06 | 0.08 | 0.02 |
| | $\|b^*\|$ | 2.97 | 3.05 | 2.79 | 2.79 | 3.19 | 3.10 | 2.87 |
| | $\|\Delta b^*\|$ | 0.28 | 0.34 | 0.17 | 0.18 | 0.48 | 0.48 | 0.26 |

* Proportion of each element in composition analysis is expressed in units of atom %.

As shown in Table 1, in the examples, an enhancement in adhesiveness by the modification treatment was achieved and also the occurrence of a stretching-induced crack was reduced. On the other hand, in the comparative examples, the occurrence of a stretching-induced crack resulted in an exposure of the modification-untreated inner portion of the film to the surface. Consequently, on the surface, a sea-island structure was observed (see FIG. 5) that had modification-untreated portions as the sea and modification-treated portions as the island.

INDUSTRIAL APPLICABILITY

The fluorine resin film of the present invention can be used, for example, as a coating film for coating the surface of a rubber-containing substrate included in a molded rubber body.

The invention claimed is:

1. A fluorine resin film comprising an ethylene-tetrafluoroethylene copolymer as a fluorine resin, wherein the fluorine resin film has a surface subjected to a modification treatment, and has, at the surface, the following proportion of each of carbon, oxygen, and fluorine elements based on 100 atom % of a sum of the elements:

30 atom % or more and 70 atom % or less of carbon;

0.6 atom % or more and less than 13 atom % of oxygen; and 60 atom % or less of fluorine, with the proviso that a fluorine/carbon element ratio (F/C ratio) at the surface is 1.15 or more, and an oxygen/carbon element ratio (O/C ratio) at the surface is less than 0.08.

2. The fluorine resin film according to claim 1, wherein the fluorine/carbon element ratio (F/C ratio) at the surface is 1.15 or more and 1.82 or less.

3. The fluorine resin film according to claim 1, wherein an absolute value of a value of b* of CIE1976 (L*, a*, b*) color space specified in JIS Z 8781-4:2013 at the surface is less than 3.1.

4. The fluorine resin film according to claim 1, wherein with respect to b* of CIE1976 (L*, a*, b*) color space specified in JIS Z 8781-4: 2013, an absolute value of a difference Δb* between a value of $b^*_1$ at the surface and a value of $b^*_0$ in a white reflectance standard specified in JIS Z 8781-4:2013 is 0.45 or less.

5. The fluorine resin film according to claim 1, wherein an absolute value of a value of a* of CIE1976 (L*, a*, b*) color space specified in JIS Z 8781-4:2013 at the surface is 0.05 or less.

6. The fluorine resin film according to claim 1, wherein the surface has an adhesiveness of 4.0 N/19 mm or more expressed as a peel strength evaluated by a 180° peel test, where the 180° peel test is performed by attaching the fluorine resin film and an adhesive tape (No. 31B manufactured by NITTO DENKO CORPORATION, 80 μm thick) to each other so that an adhesive surface of the adhesive tape and the surface are in contact with each other, and then peeling off the adhesive tape from the fluorine resin film.

7. The fluorine resin film according to claim 1 having a thickness of 10 to 300 μm.

8. The fluorine resin film according to claim 1 being a coating film for coating a surface of a rubber-containing substrate included in a molded rubber body.

9. A molded rubber body comprising:

a rubber-containing substrate; and a resin film, wherein the rubber-containing substrate has a surface coated with the resin film, and the resin film is the fluorine resin film according to claim 1.

10. A fluorine resin film comprising a fluorine resin, wherein the fluorine resin film has a surface subjected to a modification treatment, and has, at the surface, the following proportion of each of carbon, oxygen, and fluorine elements based on 100 atom % of a sum of the elements:

30 atom % or more and 70 atom % or less of carbon;

0.6 atom % or more and less than 13 atom % of oxygen; and 60 atom % or less of fluorine, with the proviso that a fluorine/carbon element ratio (F/C ratio) at the surface is 1.15 or more and 1.33 or less, and an oxygen/carbon element ratio (O/C ratio) at the surface is less than 0.08.

11. The fluorine resin film according to claim 10, wherein the fluorine resin is at least one selected from the group consisting of polytetrafluoroethylene and an ethylene-tetrafluoroethylene copolymer.

* * * * *